United States Patent [19]

Nomura et al.

[11] Patent Number: 4,966,501

[45] Date of Patent: Oct. 30, 1990

[54] COATED CEMENTED CARBIDE TOOL

[75] Inventors: Toshio Nomura; Masuo Chudo, both of Itami, Japan

[73] Assignee: Sumitomo Electric Industries, Ltd., Osaka, Japan

[21] Appl. No.: 216,523

[22] Filed: Jul. 7, 1988

[30] Foreign Application Priority Data

Jul. 10, 1987 [JP] Japan .............................. 62-173689

[51] Int. Cl.$^5$ ............................................. B23P 15/28
[52] U.S. Cl. .................................... 407/119; 428/698; 428/699
[58] Field of Search ................. 407/119; 428/698, 699

[56] References Cited

U.S. PATENT DOCUMENTS 4,239,819 12/1980 Holzl ................................ 427/255.2
4,616,963 10/1986 Habert et al. ....................... 407/116
4,720,437 1/1988 Chudo et al. ....................... 428/699

FOREIGN PATENT DOCUMENTS 2096507 2/1972 France .
2243754 9/1973 France .

OTHER PUBLICATIONS

Patent Abstracts of Japan, vol. 7, No. 61, Mar. 15, 1983. JP-A-57 210 970 Mitsubishi Kinzokuk. K. 1982 Abstract.

Primary Examiner—Frederick R. Schmidt
Assistant Examiner—Lawrence Cruz
Attorney, Agent, or Firm—Wenderoth, Lind & Ponack

[57] ABSTRACT

A coated cemented carbide tool insert with a lengthened life is provided which comprises a substrate of a cemented carbide and a coating film provided thereon consisting of one or more layers of 2 to 20 μm in thickness, each consisting of a compound with a higher hardness than the substrate, in which at least the surface of the coating film, on and near the ridgeline of cutting tip, of the surfaces of the tool is substantially composed of a smooth surface with a surface roughness Rmax of at most 0.2 μm to the standard length of 5 μm.

5 Claims, 3 Drawing Sheets (a)

(b)

(a)

(b)

COATED CEMENTED CARBIDE TOOL

BACKGROUND OF THE INVENTION

1. Field of the Invention

This invention relates to coated hard metal tools suitable for use in cutting of metals, for example, turning, milling, threading, drilling, boring, etc. The coated hard metal used herein comprises a substrate of cemented carbide consisting of WC, TiC, TaC, etc. and an iron group metal, or a substrate of hard sintered alloy such as cermet consisting predominantly of TiC, TiN, etc., and one or more coating layers provided thereon each consisting of a carbide, nitride, carboxide, carbonitride or carboxynitride of Group IVa, Va or VIa element of Periodic Table, oxide or oxynitride of Al or Zr, or solid solution thereof, the coating layer having a higher hardness and wear resistance than the substrate.

In the field of cutting of metals, working conditions have become severer with the years and it has been required for cutting tools used to this end to increase the hardness, wear resistance and heat resistance. Cemented carbide tools are capable of satisfying these requirements to some extent, but tools of cemented carbides with various hard layers have lately spread. A typical form of the tools is as exemplified in FIG. 3 in which a cemented carbide insert 1 is fixed to a holder 2 in many cases. This is generally called a throwaway insert which is to be thrown away to make an exchange for a new insert after using cutting edge corners (in the case of FIG. 3, 6 corners). In these coated cemented carbide tools, the surface of the cemented carbide insert 1 is ordinarily coated by a CVD method, PVD method or the like.

Generally, cutting tools are required to be excellent in both of wear resistance and toughness. In the case of the coated cemented carbide inserts, however, there is such an antimony, as well known in the art, that if the thickness of the hard coating is increased so as to improve the wear resistance, the toughness is deteriorated.

In order to solve the above described problems, various methods have been proposed, for example, wherein the coating film near the cutting edge is partly made thinner or removed (Japanese Patent Publication No. 37553/19 and Japanese Patent Laid-Open Publication Nos. 219122/1984, 24371/1985 and 447203/1985).

However, the requirements for the grade of a finished surface of a workpiece to be machined or cut have lately become severer and as shown in FIG. 4, for example, a very localized damage 6 of a coating film has often been regarded as the life of a tool although the life of a tool is generally judged by a macroscopic average wear (flank wear 5, crater depth 4) or breakage of a cutting edge (ridgeline of cutting tip) because this is transferred to a machined surface of a workpiece. Thus, there are many cases wherein a cutting tool is exchange for a new one when the flank wear width reaches about 0.1 mm that is much less than the standard for the life of a tool due to wearing, i.e. a flank wear width of 0.2 to 0.3 mm, as ordinarily allowed in the art.

Under the situation, it has been required to decresase the localized damages even when a higher quality is required on the finished surface of a workpiece. To this end, it is considered to employ a thin coating film, but the wear resistance, as a whole, is lacking. Therefore, a structure such that the localized damage is hard to occur event if the film thickness is large has eagerly been desired.

SUMMARY OF THE INVENTION

It is an object of the present invention to provide a coated hard metal tool suitable for use in cutting of metals.

It is another object of the present invention to provide a coated cemented carbide tool with a lengthened life.

It is a further object of the present invention to provide a coated cemented carbide cutting tool insert having such a structure that the coating film near the cutting edge is hard to be damaged.

These objects can be attained by a cutting tool comprising a substrate of a cemented carbide and a cutting film provided thereon consisting of one or more layers of 2 to 20 $\mu$m in thickness, each consisting of a compound with a higher hardness than the substrate, in which at least the surface of the coating film, at and near the ridgeline of cutting tip, of the surface of the tool is substantially composed of a smooth surface with a surface roughness Rmax of at most 0.2 $\mu$m to the standard length of 5 $\mu$m.

BRIEF DESCRIPTION OF THE DRAWINGS

The accompanying drawings are to illustrate the principle and merits of the present invention in detail.

DETAILED DESCRIPTION OF THE INVENTION

The inventors have made various efforts to solve the above described problems of the prior art and consequently, have found as a result of observing a local damage on a coating layer of a tool, occurring prior to largely wearing, that as a method for reducing impacts suffering through contact of the surface of the coating layer with a workpiece many times when the workpiece is subjected to to cutting, and decreasing factors having bad influences upon the damage of the tool, for example, welded materials, as far as possible, it is effective to reduce the surface roughness on the surface of the coating layer. Generally, the larger the thickness of the coating layer, the larger the crystal grains, i.e. the surface roughness of the coating layer. Therefore, the most simple method for obtaining both a relatively thick coating layer from the viewpoint of the near resistance and a smooth surface of a coating layer from the view point of preventing the coating film from a localized damage consists in subjecting the surface of the coating layer of a tool, including at least a cutting edge, to mechanical polishing after coating and thus improving the surface roughness.

Accordingly, the present invention provides a cutting tool comprising a substrate of a cemented carbide and a coating film provided thereon consisting of one or more layers of 2 to 20 μm in thickness, each consisting of a compound with a higher hardness than the substrate, in which at least the surface of the coating film, on and near the ridgeline of cutting tip, of the surface of the tool is substantially composed of a smooth surface with a surface roughness Rmax of at most 0.2 μm to the standard length of 5 μm.

In one preferred embodiment of the present invention, the above described smooth suraface is obtained by barrel finsihing, buff polishing, brush honing or lapping treatments using an elastic grinding wheel or diamond wheel. In addition to these mechanical treatments, the above described object can be achieved by chemical etching or improving the coating method itself to give the above specified surface roughness.

In the present invention, the coating film should have a thickness of 2 to 20 μm, since if the thickness is less than 2 μm, the wear resistance by the coating is not sufficient and if more than 20 μm, the strength of the coating film itself is lowered and the temperature is also deteriorated, which are not suitable as a cutting tool.

The relationship between the properties of the surface of a coating film and the performances of a coated cemented carbide insert will now be illustrated, for example, as to a coated cemented carbide insert having an $Al_2O_3$ film as the outermost coating layer.

Figure 4:
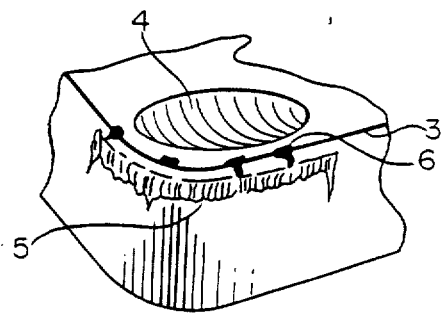
FIG. 4 and FIG. 5 are enlarged schematic views of the corner part of a tool insert to illustrate the merits of the present invention, FIG. 4 showing a worn and damaged state of the corner part and FIG. 5 showing a contacted and worn state of workpiece and insert.
Figure 5:
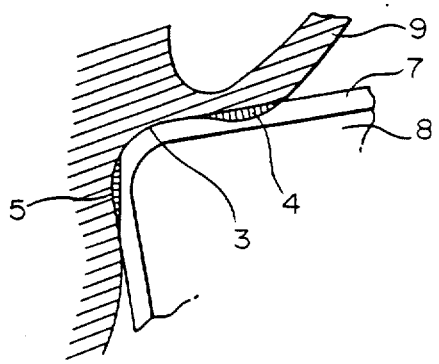

FIG. 4 is an enlarged schematic view (perspective view) showing a worm state at the cutting corner of a throwaway insert and FIG. 5 is a schematic view showing a contacted and worn state of a workpiece 9 and a corner part of a tool insert consisting of a hard coating film 7 and cemented carbide substrate 8 during machining. Up to the present time, a flank wear width 5 and creater depth 4 have generally used as a standard of the life of a tool. Observation of a wearing progress in a coated cemented carbide insert in greater detail teaches that the wearing progress is relatively slow in the vicinity of a ridgeline 3 as shown in FIG. 4 and FIG. 5 and the coating film 7 is locally peeled off and carried away by chips in a region where the coating film remains sufficiently thick, whereby to cause the film-peeled damage 6, expose the cemented carbide substrate 8, further cause local wearing to progress, deteriorate the grade of the finished surface of a workpiece and promote the flank wear itself. According to our studies to prevent coated cemented carbide inserts from such a damage mechanism of the cutting edge, it is found that the life of a coated cemented carbide insert until the coating film is peeled can largely be lengthened by making smooth the surface of the coating film 7 on or near the ridgeline 3.

Figure 1:
FIG. 1(a) and FIG. 1(b) are 8000-multiplied photographs of particle structures by SEM as to a coated cemented carbide tool according to the present invention, (a) being that of the surface part and (b) being that of a film cross section of the surface part thereof.
Figure 1:
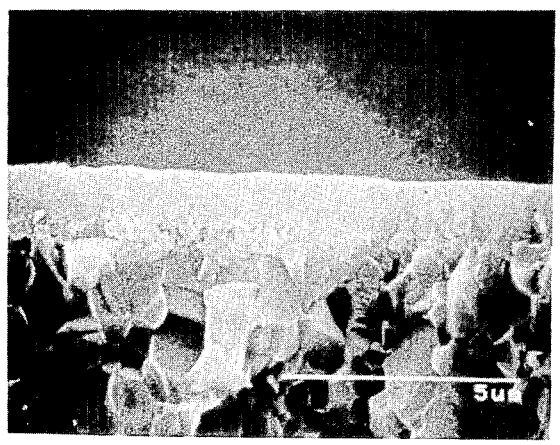
Figure 2:
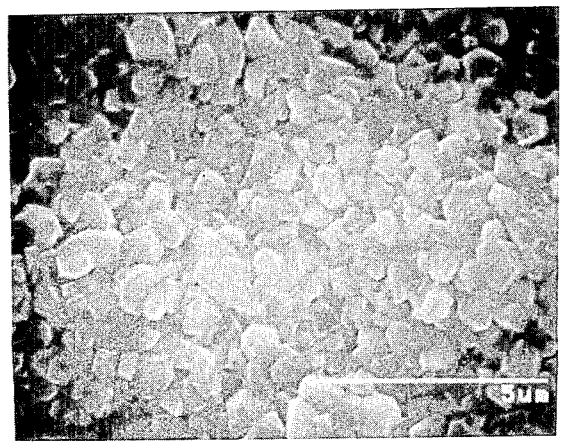
FIG. 2(a) and (b) are similarly enlarged photographs of particle structures by SEM as to a coated cemented carbide tool according to the prior art, (a) being that of the surface part and (b) being that of a film cross section of the surface part thereof.
Figure 2:
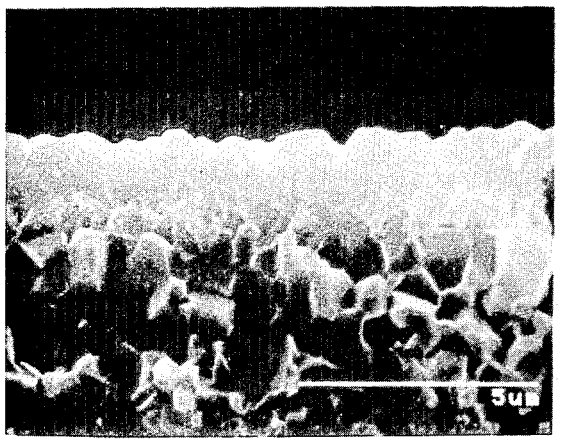

The surface of an ordinary coated cemented carbide insert consists of a polycrystalline film with a cross-sectional roughness corresponding to the crystal size of a coating material as shown in FIG. 2(a) and (b). FIG. 2(a) and (b) are 8000-multiplied photographs of particle structures by SEM (scanning electron microscope), (a) being a plan view of the surface and (b) being a side view of a flim cross-section of the surface part. Since the $Al_2O_3$ film as the outermost surface of the coating layers has a poor electroconductivity, a sample to be observed is subjected to ion sputtering as a pretreatment and thus coated with a thin film of Au so as to clarify the image. The coated Au thin film has such an adequately homogeneous thickness of at most 100 Å that there is little error in the microscopic surface roughness of the sample. In the example as shown in FIG. 2(b), the surface roughness Rmax to the standard length 5 μm is about 0.4 μm. On the other hand, the surface of another $Al_2O_3$ coating film, which is smoothened according to the present invention, is shown in FIG. 1(a) and (b) in which Rmax is about 0.15 μm.

Rmax of 0.2 μm or less is effective for retarding occurrence of the film-peeled damage 6 at the ridgeline 3 as described above (FIG. 4). When the surface of the coating film on or near the ridgeline 3 has a surface roughness Rmax of exceeding 0.2 μm to the standard length 5 μm, there takes place a film peeling in a region where the coating film remains sufficiently thick in the vicinity of the ridgeline of cutting tip before the life of the insert is exhausted by an ordinary flank wear or rake wear, from which welding or surface napping or surface roughening of a workpiece to be cut starts, or the peeling further spreads to result in abnormal wearing. Therefore, a surface roughness of 0.2 μm or less is preferable.

As shown in FIG. 5, wearing gradually proceeds from the initial stage of cutting on the rake face and flank face to give smooth surfaces, whereas wearing of the coating film does not so proceed and the surface roughness of the coating film is sustantially maintained during cutting as it is at the ridgeline 3 that is present as "dead zone" during cutting. On the other hand, in general, a cutting insert is repeatedly exposed to intermittent thrusting in and releasing from a workpiece to be cut in machinings such as by not only milling but also turning. If the surface roughness is maintained on and near the ridgseline of cutting tip 3 during the same, welding of the workpiece occurs thereon or complicated forces are applied thereto, as a result of number of impacts, thus resulting in a localized damage or breakage or breakage of the film.

When the surface of a coating layer is made smooth according to the present invention, however, the stress concentration during the impact cycles can be moderated to decrease the welding of a workpiece and lengthen the life of the tool. As is evident from the above described mechanism of machining, it is required that the surface is made smooth at least on and near the ridgeline of the cutting tip.

Ordinarily, the surface roughness of a coating flim is composed of an undulation or roughness substantially transferred from the surface of a cemented carbide substrate before coating and a roughness of a polycrystalline coating film, in combination. However, it is surprisingly found by the inventors that the above described phenomenon is mainly related with not the undulation but the roughness, so the surface roughness of a cemented carbide substrate can sufficiently be of the level of an ordinarily ground surface. That is, in order to exclude the effect of the undulation of a substrate surface, the standard length for measuring the surface roughness Rmax is defined to 5 μm in the present invention.

For the purpose of exhibiting the advantages or effects of the present invention, 100% of the surface on and near the ridgeline of cutting tip should not always be made smooth, but if the surface with an area of at least 50% has a surface roughness of at most 0.2 μm, these advantages can substantially be obtained.

The surface roughness of a cemented carbide substrate can sufficiently be that of an ardinarily ground surface as described above, but in another embodiment of the present invention, of course, the surface roughness of a cutting insert can be controlled by previously reducing the surface roughness of a cemented carbide substrate, for example, by lapping, followed by usually coating.

Cutting Conditions

Workpiece: SCM 304 ($H_B$ 210), 200 mm diameter × 15 mm width
Cutting Speed: 120 m/min
Cutting Depth: 1.5 mm
Feed: 0.15 mm/rev
Cutting by Dry Process

TABLE 1

| Coating Film Surface Roughness[1] (μm) | Substrate Surface Roughness[2] (μm) | Hard Film Coating Layer | | | | | | Number of Cutting Feasible Workpieces |
|---|---|---|---|---|---|---|---|---|
| | | Lower Layer | | Intermediate Layer | | Upper Layer | | |
| | | Composition | Thickness (μm) | Composition | Thickness (μm) | Composition | Thickness (μm) | |
| Prior Art | | | | | | | | |
| A  0.3 | 3.2 | TiC | 6 | — | — | $Al_2O_3$ | 1 | 10 |
| B  0.4 | 2.0 | TiC | 7 | TiCN | 0.5 | $Al_2O_3$ | 1 | 9 |
| C  0.5 | 3.2 | TiC | 4 | — | — | $Al_2O_3$ | 3 | 8 |
| D  0.4 | 2.0 | TiC | 3 | TiN | 3 | $Al_2O_3$ | 2 | 9 |
| E  0.3 | 3.2 | TiCN | 5 | $Al_2O_3$ | 1 | TiN | 1 | 10 |
| Our Invention | | | | | | | | |
| F  0.05 | 3.2 | TiC | 6 | — | — | $Al_2O_3$ | 1 | 20 |
| G  0.13 | 2.0 | TiC | 7 | TiCN | 0.5 | $Al_2O_3$ | 1 | 19 |
| H  0.19 | 3.2 | TiC | 4 | — | — | $Al_2O_3$ | 3 | 17 |
| I  0.10 | 2.0 | TiC | 3 | TiN | 3 | $Al_2O_3$ | 2 | 18 |
| J  0.05 | 3.2 | TiCN | 5 | $Al_2O_3$ | 1 | TiN | 1 | 22 |

Note:
(1) Standard Length: 5 μm
(2) Standard Length: 0.8 mm according to JIS

The following examples are given in order to illustrate the present invention in detail without limiting the same.

EXAMPLE 1

A cutting insert having a Form No. of ISO and a shape of SNMG 120408 was made of a cemented carbide with a composition of 88% WC-3% TiC-3% NbTaC-6% Co (%: by weight) and the whole ridgeline of cutting tip was subjected to an edge treatment for curved-surface chamfering with a width of 0.05 mm viewed from the rake face side using a vibrating barrel, following by measuring the surface roughness in the vicinity of the ridgeline. On the thus resulting substrates were formed hard coating films of various structures as shown in Table 1 by an ordinary CVD method (Chemical Vapor Deposition) to obtain various products. Some of them were used as samples as they were and the others were subjected to lapping by the use of diamond powder with an average grain size of 4 μm to make smooth the outermost surface of the coating films, thus obtaining other samples. Thus, the sample with two kinds of surface roughness were prepared and subjected to measurement of the surface roughness, in which the surface roughness to the standard length of 5 μm was examined by a SEM photograph of the cross section of the insert sample so as to distinguish it from undulations transferred from the substrate.

Enlarged views of the surface particle structure of Insert B are shown in FIG. 2(a) and (b) and those of Insert G are shown in FIG. 1(a) and (b).

Using these sample inserts for cutting, a cutting test was carried out under the following conditions to compare the number of cutting-feasible samples until the coating film at the cutting edge met with a localized peeling, thus obtaining results as shown in Table 1.

EXAMPLE 2

Insert A of the prior art, used in Example 1, and Insert F of the present invention, used in Example 1, were subjected to a cutting test under the following conditions:

Cutting Conditions

Workpiece: SCM 415 (Hs 200) 200 mm diameter × 30 mm width
Cutting Speed: 200 m/min
Cutting Depth: 1.5 mm
Feed: 0.3 mm/rev
Water-soluble Cutting Oil In this test, Insert A of the prior art met with peeling of the coating film at the ridgeline when 90 workpieces were machined, while in the case of Insert F of the present invention, the coating film was partially peeled when 160 workpieces were machined.

Advantages of the Invention

As can be seen from Table 1, the insert of the present invention is capable of processing or machining more workpieces until the coating film is partially peeled, than those of the prior art, thus teaching that the insert of the present invention has a long life. In the cutting tool of the present invention, damage of the coating film in the vicinity of the cutting edge or ridgeline of cutting tip is not readily caused and accordingly, there are given advantages that lowering of the grade of a finished surface of a work piece through welding of the wordpiece due to peeling of the coating film can be prevented, progressing and developing of the overall wearing due to peeling of the coating film can be suppressed and the effects of formation of the coating layers can sufficiently be brought to thus lengthen the life of the tool.

What is claimed is:

1. A cutting tool comprising a substrate of sintered hard alloy and a coating film provided thereon consisting of one or more layers of 2 to 20 μm in thickness, each consisting of a compound with a higher hardness than the substrate, in which at least surface of the coating film, on and near the ridgeline of cutting tip, of the surface of the tool is polished after coating and is substantially composed of a smooth surface with a surface roughness Rmax of at most 0.2 μm to the standard length of 5 μm.

2. The cutting tool as claimed in claim 1, wherein the sintered hard alloy is selected from the group consisting of cemented carbides comprising WC, as a predominant component, and a binder metal such as iron group metals and cermets comprising TiC or TiN as a predominant component and a binder metal such as Ni.

3. The cutting tool as claimed in claim 1, wherein the compound with a higher hardness than the substrate consists of at least one member selected from the group consisting of carbides, carboxides, carbonitrides and carboxynitrides of Group IVa, Va and VIa metals of Periodic Table and oxides and oxynitrides of Zr and Al, and solid solutions thereof.

4. The cutting tool as claimed in claim 1, wherein the coating film consists of at least two layers, at least one of which is a layer consisting of an oxide of oxynitride of Al or Zr, as a predominant component.

5. The cutting tool as claimed in claim 1, wherein the reidgeline of cutting tip has a plane or curved chamfered shape.

* * * * *

UNITED STATES PATENT AND TRADEMARK OFFICE
CERTIFICATE OF CORRECTION

Page 1 of 2

PATENT NO. : 4,966,501

DATED : October 30, 1990

INVENTOR(S) : Toshio NOMURA and Masuo CHUDO

Figure 3:
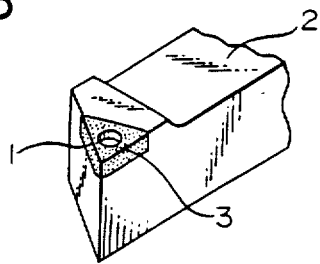
FIG. 3 is a perspective view of a throwaway insert, as one embodiment of the present invention, clamped by a holder.

It is certified that error appears in the above-identified patent and that said Letters Patent is hereby corrected as shown below:

Please add Figs 3-5 as attached.

Signed and Sealed this

Second Day of June, 1992

*Attest:*

DOUGLAS B. COMER

*Attesting Officer*     *Acting Commissioner of Patents and Trademarks*